United States Patent [19]
Damour

[11] Patent Number: 5,476,437
[45] Date of Patent: Dec. 19, 1995

[54] REMOVABLE CLAMP ASSEMBLY

[75] Inventor: Lawrence R. Damour, Succasunna, N.J.

[73] Assignee: Converter Accessory Corp., Wind Gap, Pa.

[21] Appl. No.: 296,813

[22] Filed: Aug. 26, 1994

[51] Int. Cl.$^6$ .................................................. F16C 13/00
[52] U.S. Cl. .................................................. 492/47; 492/56
[58] Field of Search .................................. 492/22, 56, 47, 492/24, 25, 59

[56] References Cited

U.S. PATENT DOCUMENTS

| | | | |
|---|---|---|---|
| 2,437,050 | 2/1945 | Schulz | 492/25 |
| 4,571,132 | 2/1986 | Bunge | 409/234 |
| 4,625,376 | 12/1986 | Schiel et al. | 492/22 |
| 4,862,565 | 9/1989 | Damour | 26/99 |
| 4,864,704 | 9/1989 | Hogaw et al. | 492/22 |
| 5,210,920 | 5/1993 | Manzolati | 492/47 |

*Primary Examiner*—Irene Cuda
*Assistant Examiner*—Marc W. Butler
*Attorney, Agent, or Firm*—Patrick J. Pinto

[57] ABSTRACT

A removable clamp assembly for the ends of an elastomer sleeve of a spreader roller which includes and outer bearing ring, a clamp cup and a clamp cover. The outer bearing ring has a textured outer diameter which is sized to fit closely in said elastomer sleeve. The outer bearing ring also includes a central bore for mounting of an anti friction bearing therein. The clamp cup is sized to fit on the outer diameter of the elastomer sleeve and includes a plurality of clamp segments which are arrayed on the outer edge of an end ring. The segments have a tapered outer surface terminating in a mouth portion. A clamp cover is fitted onto and over the tapered outer surface thereby clamping said elastomer sleeve between the clamping segments and the bearing ring.

6 Claims, 1 Drawing Sheet

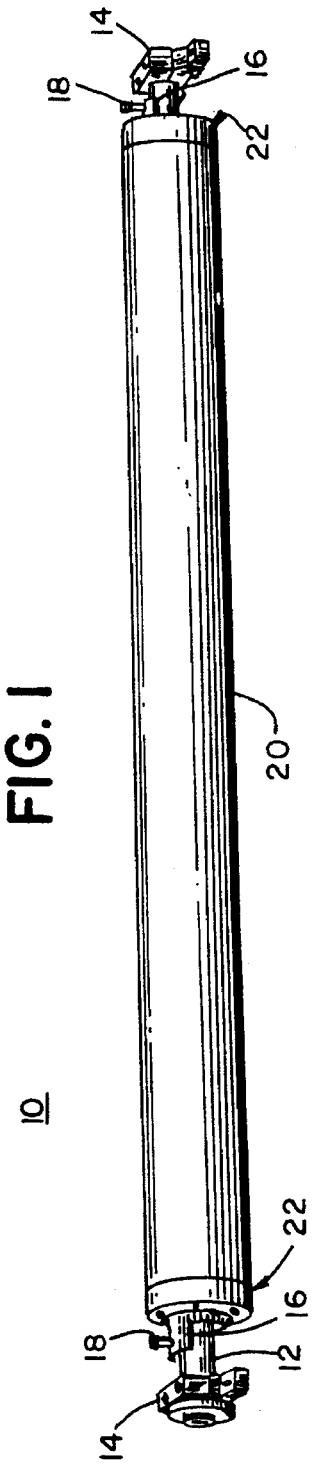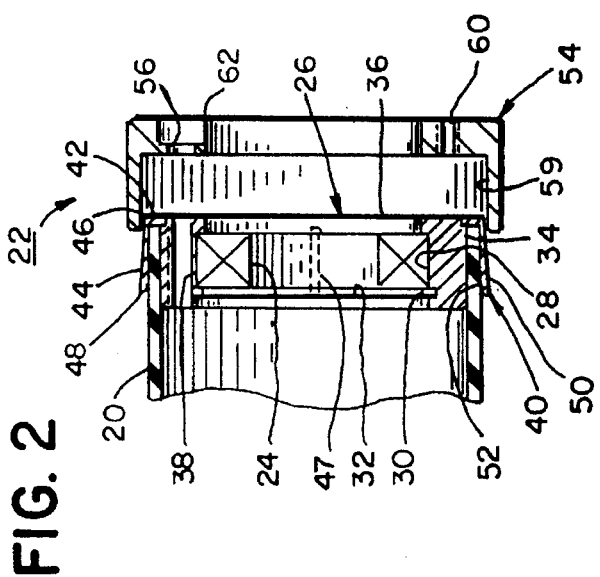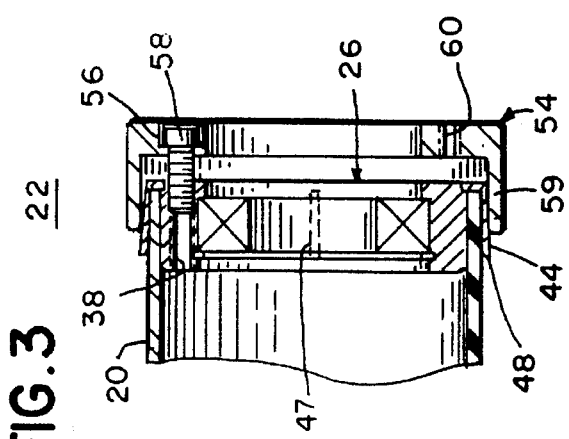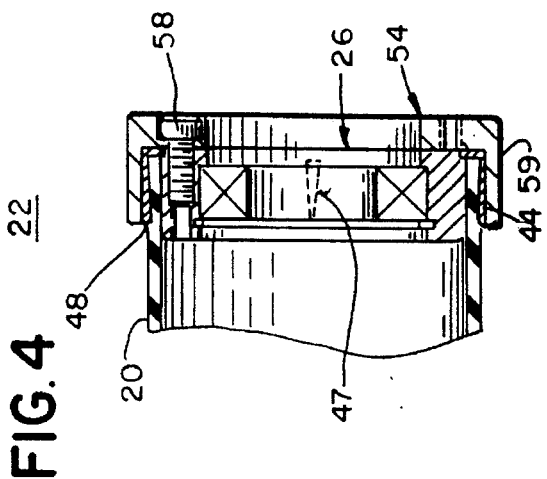

REMOVABLE CLAMP ASSEMBLY

BACKGROUND OF THE INVENTION

1. Field of the Invention

With regard to the classification of art, this invention is believed to be found in the general class entitled "TEXTILES, CLOTH FINISHING" and more particularly to those subclasses pertaining to a "REMOVABLE CLAMP ASSEMBLY" for the ends of an elastomer sleeve portion of a spreader roller.

2. Description of the related art

Expanding devices for webs of traveling material are well known. One example of such an expanding device is shown in U.S. Pat. No. 4,862,565, which was granted to the present inventor on Sep. 5, 1989. In that cited prior art, a spreader roller using a resilient sleeve member is rotated about a fixed shaft. The resilient sleeve member is expanded and contracted as it is rotated through 360 degrees of rotation. The expansion and contraction is adjustable and usually controlled by a pair of bearing blocks which are pivotally carried by the fixed shaft. The roller disclosed in U.S. Pat. No. 4,862,565 has been successfully used in the finishing of traveling webs of material.

However due to its construction, the spreader roller disclosed in U.S. Pat. No. 4,862,565 has required that the entire roller assembly be returned to the factory for replacement of a worn resilient sleeve member. It certainly can be recognized that this would possibly place a hardship on the operators of the web handling equipment.

It has been determined that there is a need to reduce the down time associated with the repair of a spreader roller. It has been determined that an apparatus which will allow the resilient sleeve member to be replaced at the work site will fill that need.

The present invention allows a technician, in the field, to replace the resilient sleeve member when necessary. This present invention only requires the use of ordinary tools for installation and removal of the clamp assembly.

SUMMARY OF THE INVENTION

In brief, the present invention may be summarized as: a removable clamp assembly for the ends of a elastomer sleeve of a spreader roller comprising: a) an outer bearing ring having a central bearing bore, a bearing retaining means, an outer diameter and a face portion, a peripheral surface of the outer diameter having a predetermined pattern formed thereon for gripping a predetermined portion of an inside diameter of the rubber sleeve, the face portion having a plurality of threaded apertures formed therein; b) a clamp cup including an end ring member and a plurality of clamping segments, the clawing segments being formed at predetermined intervals along an outer edge of the end ring, each of the clamping segments including a tapered outer surface, and an inner clamping surface, the predetermined intervals allowing a mouth portion of the clamping cup to be reduced in diameter when urged; c) a clamp cover having a bottom portion and a sidewall portion forming a cup-like array, the bottom portion having a plurality of through apertures arrayed for alignment with the threaded apertures in the face portion of the outer bearing ring, an inner surface of the sidewall being sized for mating with the outer edge; d) a plurality of threaded fasteners sized for fitting into the through apertures and for threading into the threaded apertures; and wherein as the threaded fasteners are threaded into the threaded apertures, the inner surface of the clamp cover is drawn onto and over the clamping segments of the clamp cup causing the mouth portion of the clamping segments to be reduced in diameter thereby clamping the resilient sleeve between the inner clamping surface of the clamping segments and the outer diameter of the bearing ring.

In addition to the above summary, the following disclosure is intended to be detailed to insure adequacy and aid in the understanding of the invention. However, this disclosure, showing embodiments of the invention, is not intended to describe each new inventive concept which may arise. These specific embodiments have been chosen to show at least one best mode for the removable clamp assembly of the present invention. These specific embodiments, as shown in the accompanying drawings, may also include diagrammatic symbols for the purpose of illustration and understanding.

BRIEF DESCRIPTION OF THE DRAWING

FIG. 1 represent a pictorial view of a typical spreader roller with a removable clamp assembly of the present invention assembled thereon.

FIG. 2 represents a fragmentary side sectional view of the present invention, this view showing a first in a series of steps in assembling the present invention on a spreader roller.

FIG. 3 represents a fragmentary side sectional view of the present invention, this view showing a second in a series of steps in assembling the present invention on a spreader roller.

FIG. 4 represents a fragmentary side sectional view of the present invention, this view showing a third in a series of steps in assembling the present invention on a spreader roller.

In the following description and in the claims, various details are identified by specific names for convenience. These names are intended to be generic in their application while differentiating between the various details. Corresponding reference numbers refer to like members throughout the several figures of the drawing.

The drawing accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

Referring first to FIG. 1, a typical spreader roller assembly is generally identified as 10. This typical spreader roller 10 is used to provide edge to edge stretching of fast moving webs of materials. The fast moving web of material is generally wrapped around the roller 10 for a predetermined arc length. This predetermined arc contact may vary between 10 degrees and 180 degrees. The fast moving web is generally removed from the roller 10 at or before the point of maximum sleeve length.

The roller assembly 10 includes a shaft 12 which may be fastened to a conveyor frame by a pair of mounting blocks 14. It is usually preferred that the mounting blocks 14 be of the split type, so that the position of the roller 10 may be adjusted to meet the needs of the material path.

Expansion and contraction of the roller assembly 10 is controlled by at least one pivotable bearing mount 16. An adjusting screw 18 is used to control the angle of the axis of the bearing mount 16 with respect to the axis of the fixed shaft 12.

The rotating portion of the roller assembly 10 includes an elastomer sleeve or tubing 20, which is held in place at each end by a removable clamp assembly 22. Each removable clamp assembly 22 may be seen in greater detail in FIGS. 2 through 4.

Referring now to FIG. 2, an anti-friction bearing 24 is retained in an outer bearing ring 26. One example of a preferred anti-friction bearing 24 is a ball bearing, but other types of a bearing may be used. The inner race of the bearing is carried on the bearing mount 16, which has been shown in FIG. 1. An outer race of the bearing 24 is seated in a central bearing bore 28. It is preferred that the bearing 24 be retained by a convention retaining ring 30 which is seated in an annular groove 32. Other retaining means for the bearings may be used, such as a press fit or staking.

The outer bearing ring 26 further includes an outer diameter 34 and an outer face 36. A textured pattern, such as a diamond knurl is formed on the periphery of the outer diameter 34. It has been found that a knurled surface provides a needed gripping surface for the inside diameter of the elastomer sleeve 20. A plurality of threaded apertures 38 are formed in the outer bearing ring 26 at right angles to the outer face 36. It has been found that 3 apertures 38 equally spaced on a bolt circle meets the needs of the clamp assembly 22.

Referring still to FIG. 2, the outer bearing ring 26 is seated interior of the elastomer sleeve 20. It is preferred that there be little or no play between the sleeve 20 and the bearing ring 26.

A clamp cup 40 is placed over the outside diameter of the sleeve 20. This clamp cup 40 includes an end ring member 42; and a plurality of clamping segments 44. Each of the clawing segments 44 is formed at predetermined intervals along an outer edge 46 of the end ring member 42. These predetermined intervals provide gaps 47 between the clamping segments for allowing a mouth portion 48 to be reduced when urged inward. Each of the clamping segments 44 further include a tapered outer surface 50 and an inner clamping surface 52. It is preferred that the mouth portion 48 have a rounded edge for minimizing cutting of the elastomer sleeve. It is very important that all surfaces of the clamping cup 40 have a smooth finish. As an example: it has been found that 4 clamping segments 44 provide the necessary characteristics for the clamp cup 40 when used with a 8.25 cm (3.25 in.) dia. Sleeve. It may be necessary to increase the number of segments as the diameter of the sleeve is increased. The preferred material for the clamp cup is steel, but other materials may used such as a structural plastic, aluminum or the like.

Still referring to FIG. 2, the clamp cover 54 is placed over the end ring portion of the clamp cup 40. This clamp cover 54 must be aligned with the outer bearing ring 26 so that a plurality of through apertures 56 are in alignment with the threaded apertures 38.

Now referring to FIG. 3, a screw or bolt 58 is placed through the apertures 56 and subsequently threaded into apertures 38. Each of the screws 58 is tightened in substantially equal amounts to draw a sidewall portion 59 of the clamp cover 54 onto and over the clamping segments 44. As the clamp cover 54 is brought to a fully seated condition, substantially as shown in FIG. 4, the mouth 48 of the clawing segments 40 is contracted. This action compresses the end portion of the elastomer sleeve 20 between the inner clamping surface 52 and the outer diameter 34. Each end of the elastomer sleeve is clamped in this manner.

The clamp cover may also include a plurality of tapped apertures 60 which are formed into and through a bottom portion 62 of the clamp cover. These tapped apertures 60 allow the use of screws 58 as jacking screws when removal of the clamp cover 54 is required. It can been seen that the present invention may be used at the site of a spreader roller assembly installation. It can also be seen that common tools may be used. It is preferred that the through apertures 56 should be counterbored or countersunk for providing a smooth surface at the end of the rollers.

The configuration of the clamp cover 54 may be machined into a hub of a V-belt pulley when the roller assembly must be driven to provide the desired spreader action.

Directional terms such as "front", "back", "in", "out", downward, and the like are applicable to the embodiments shown and described in conjunction with the drawings. These terms are merely used for the purpose of description in connection with the drawings and do not necessarily apply to the position in which the present invention may be used.

While these particular embodiments of the present invention have been shown and described, it is to be understood that the invention is not limited thereto and protection is sought to the broadest extent that the prior art allows.

What is claimed is:

1. A removable clamp assembly for the ends of a elastomeric sleeve of a spreader roller comprising:

a) an outer bearing ring having a central bearing bore, a bearing retaining means, an outer diameter and a face portion, a peripheral surface of said outer diameter having a predetermined pattern formed thereon for gripping a predetermined portion of an inside diameter of the elastomeric sleeve, said face portion having a plurality of threaded apertures formed therein;

b) a clamp cup including an end ring member and a plurality of clamping segments, said clamping segments being formed at predetermined intervals along an outer edge of said end ring, each of said clamping segments including a tapered outer surface, and an inner clamping surface, said predetermined intervals allowing a mouth portion of said clamping cup to be reduced in diameter when urged;

c) a clamp cover having a bottom portion and a sidewall portion forming a cup-shaped array, said bottom portion having a plurality of through apertures arrayed for alignment with said threaded apertures in said face portion of said outer bearing ring, an inner surface of said sidewall being sized for mating with said outer edge;

a plurality of threaded fasteners sized for fitting into said through apertures and for threading into said threaded apertures; and wherein as said threaded fasteners are threaded into said threaded apertures, said inner surface of said clamp cover is drawn onto and over said clamping segments of said clamp cup causing said mouth portion of said clamping segments to be reduced, thereby clamping said elastomeric sleeve between said inner clamping surface of said clamping segments and said outer diameter of said outer bearing ring.

2. A removable clamp assembly as recited in claim 1 wherein said predetermined pattern is a diamond knurl.

3. A removable clamp assembly as recited in claim 1 wherein said mouth portion includes a rounded edge.

4. A removable clamp assembly as recited in claim 1 wherein said tapered outer surface tapers outwardly from said outer edge of said end ring.

5. A removable clamp assembly as recited in claim 1 wherein said clamp cover includes a plurality of tapped apertures, said tapped apertures cooperating with threaded fasteners when removing said clamp cover from said clamp assembly.

6. A removable clamp assembly as recited in claim I wherein said clamp cover includes an integral V-Belt Pulley.

* * * * *